United States Patent

Kaneko et al.

[11] Patent Number: 6,016,981
[45] Date of Patent: Jan. 25, 2000

[54] APPARATUS FOR PRODUCING HYDROGEN ADSORPTION ALLOY

[75] Inventors: Kantaro Kaneko; Teruya Okada; Masaru Ogata, all of Osaka, Japan

[73] Assignee: Kurimoto, Ltd., Osaka, Japan

[21] Appl. No.: 08/567,348

[22] Filed: Nov. 28, 1995

Related U.S. Application Data

[63] Continuation of application No. 08/378,867, Jan. 24, 1995, abandoned, which is a continuation of application No. 07/863,183, Apr. 3, 1992, abandoned.

[30] Foreign Application Priority Data

Apr. 23, 1991 [JP] Japan ................................. 3-122054

[51] Int. Cl.$^7$ .................................................. B02C 17/08
[52] U.S. Cl. .................. 241/175; 241/178; 241/DIG. 14
[58] Field of Search ...................... 241/170, 175, 241/176, 177, 178, 179, 180, DIG. 14

[56] References Cited

U.S. PATENT DOCUMENTS

| | | | |
|---|---|---|---|
| 3,201,273 | 8/1965 | Maker et al. | 241/176 X |
| 3,840,190 | 10/1974 | Consoli | 241/176 X |
| 4,054,292 | 10/1977 | Stone | 241/DIG. 14 X |
| 4,148,440 | 4/1979 | Eisenhauer et al. | 241/175 X |
| 4,859,413 | 8/1989 | Harris et al. | 419/32 |
| 4,915,898 | 4/1990 | Wolff et al. | 419/3 |
| 4,955,551 | 9/1990 | Jurisov | 241/175 |
| 5,029,760 | 7/1991 | Gamblin | 241/178 X |
| 5,205,499 | 4/1993 | Gamblin | 241/178 X |

FOREIGN PATENT DOCUMENTS

| | | | |
|---|---|---|---|
| 0 209 179 | 1/1987 | European Pat. Off. | |
| 2 056 940 | 5/1971 | France | |
| 782865 | 11/1980 | U.S.S.R. | 241/175 |
| 1349788 | 11/1987 | U.S.S.R. | 241/175 |
| 1470331 | 4/1989 | U.S.S.R. | 241/175 |

OTHER PUBLICATIONS

Song et al, Hydriding Properties of a Mechanically Alloyed Mixture With a Composition Mg$_2$Ni, vol. 10, No. 3, pp. 169–178.

*Primary Examiner*—Clark F. Dexter
*Attorney, Agent, or Firm*—Jones, Tullar & Cooper, P.C.

[57] ABSTRACT

A method and apparatus for producing a hydrogen adsorption alloy, the apparatus comprising a high speed ball mill in the form of a planetary ball mill mounted to a rotatable main shaft, wherein the planetary ball mill includes a plurality of mill pots each mounted for rotation on its own axis, a planetary gear disposed on the periphery of each mill pot, a fixed sun gear meshing with the planetary gears, and an atmosphere adjusting device connected to each mill pot. A drive rotates the main shaft causing each mill pot to revolve around the main shaft which results in the planetary gears traveling around the sun gear to rotate each mill pot on its own axis, the rotation of each mill pot being in the same direction as the rotation of the main shaft.

2 Claims, 11 Drawing Sheets

R=0.5

R=1.0

R=1.22

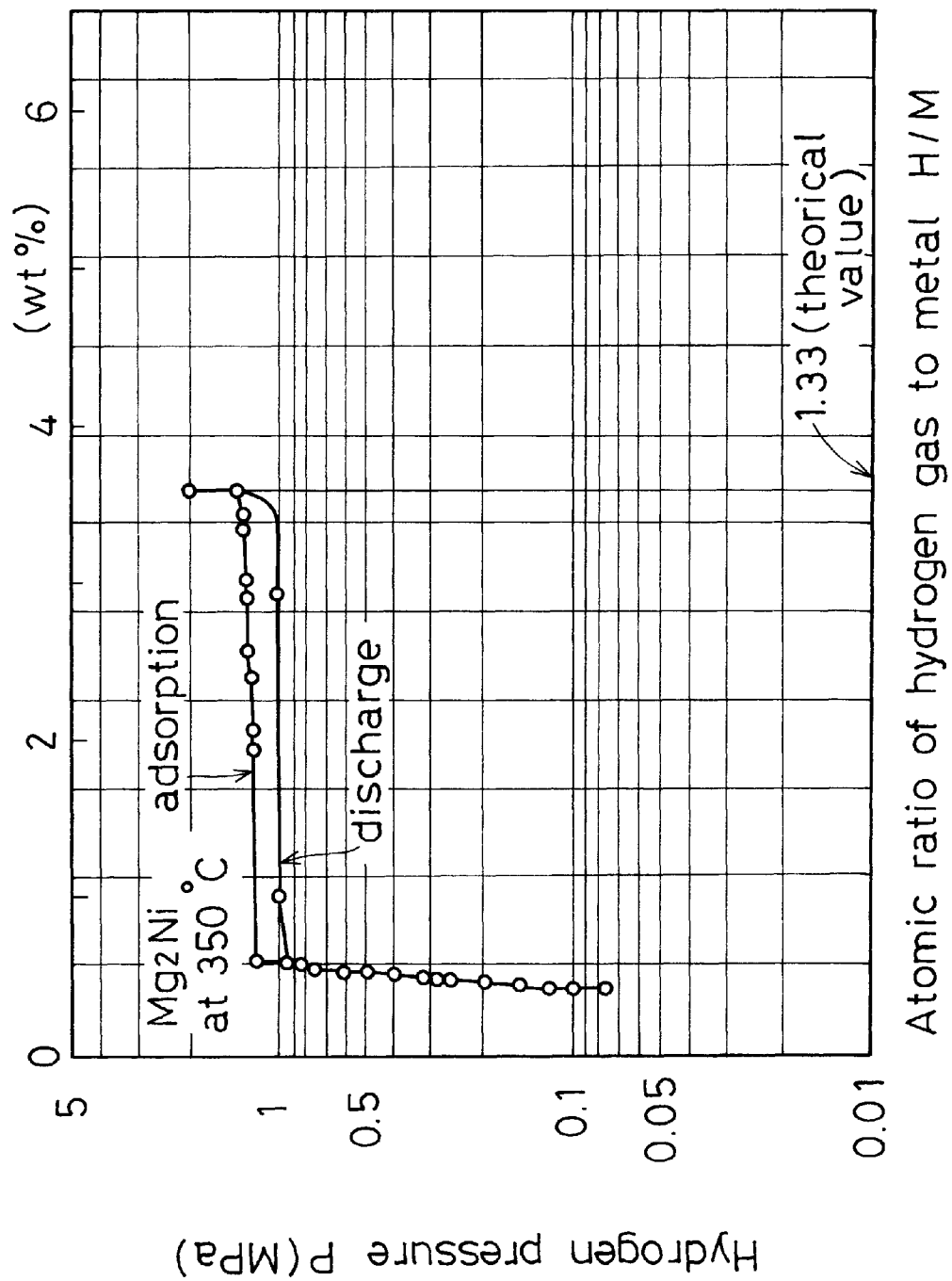

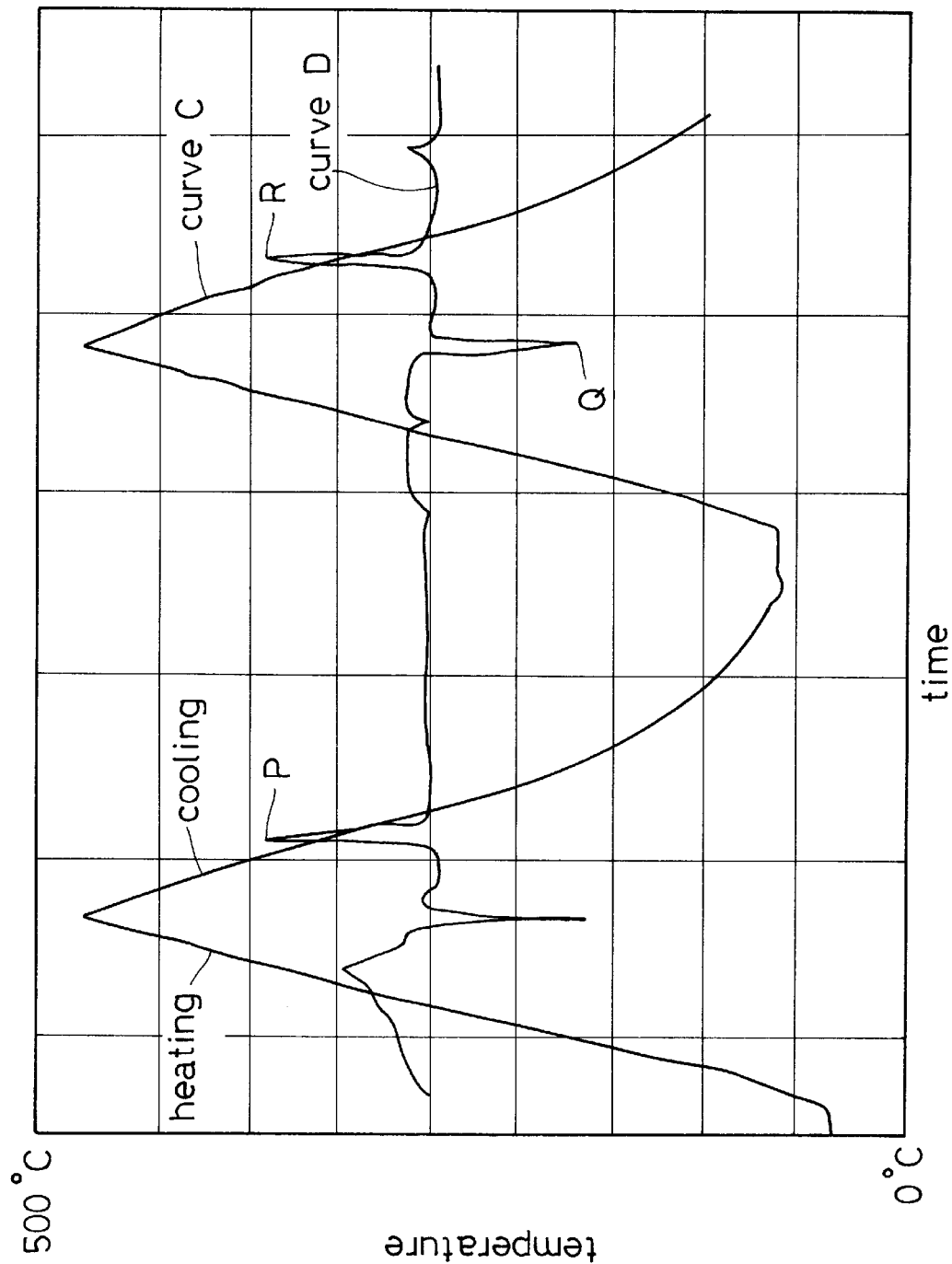

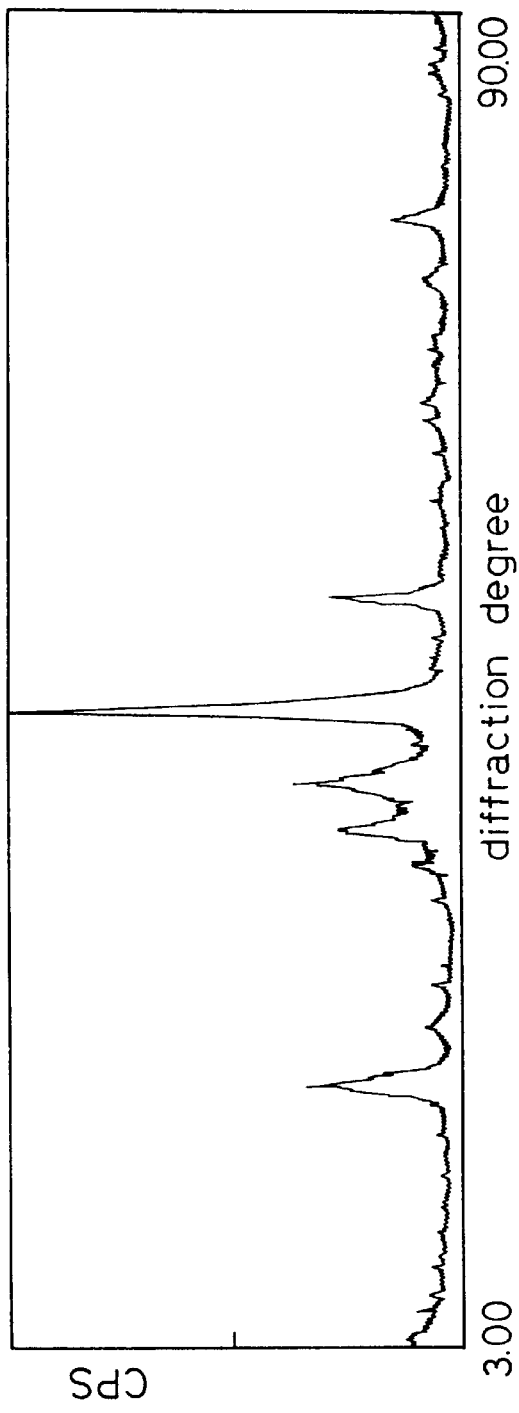
Fig. 6(A)
Fig. 6(B)
Fig. 6(C)

APPARATUS FOR PRODUCING HYDROGEN ADSORPTION ALLOY

This is a continuation of application Ser. No. 08/378,867 filed on Jan. 24, 1995, now abandoned which is a continuation application of Ser. No. 07/863,183, filed on Apr. 3, 1992, now abandoned.

BACKGROUND OF THE INVENTION

1. Field of the Invention

The present invention relates to a production method for producing a hydrogen adsorption alloy and an apparatus for use therein.

2. Prior Art

Various techniques have been heretofore developed in which hydrogen is adsorbed in a certain metal or alloy to be stored therein and transferred therefrom in the form of metal hydride, and those techniques have been further applied to such practical use as the purification of hydrogen, heat pumps, air conditioning systems, etc. In such practical applications, because an exothermic reaction or an endothermic reaction takes place without fail at the time when the metal hydride adsorbs or discharges hydrogen, such reactions or property can be utilized in heat exchanger, heat pump, etc.

Several combinations of metals forming hydrogen adsorption alloys have been proposed up to today and some of them have been actually put into practical use. Those combinations of metals are Mg—Ni, Mg—Cu, Ca—Ni, Fe—Ti, Ti—Mn, La—Ni, Mischmetal—Ni, etc. A large number of other alloys composed by substituting a different metal for a part of the mentioned metals have been also disclosed including $Mg_2Ni_{0.75}Cr_{0.25}$, $TiFe_{0.8}Mn_{0.2}$, $Ca_{0.7}Mn_{0.3}Ni_5$, $LaNi_{4.7}Al_{0.3}$.

Generally speaking, a hydrogen adsorption alloy is produced by alloying one or more metals selected from a group including Mg, Ca, La, Mischmetal, Ti, etc. with one or more metals selected from a group formed by Ni, Al, V, Cr, Fe, Co, Zn, Cu, Mn, etc.

To produce a hydrogen adsorption alloy, different kinds of metals used as material are dissolved in a high frequency induction furnace or an arc type high temperature melting furnace. A high frequency induction furnace is suitable for mass production, but it is essentially required for this furnace to be adjusted to an inert atmosphere using Ar gas or the like in view of the prevention of metals from oxidation because some of the metals, in particular, Mg, Ca, Al, etc. have a high vapor pressure when vaporized and have a strong affinity to oxygen.

After an alloy of desired composition has been obtained through the steps of dissolving the material metals to be mixed with each other and proceeding with every necessary reaction under a high temperature, then a casting is formed in a metal mold under a non-oxidizing atmosphere to obtain an ingot. The obtained ingot is then subject to a heat treatment, and after completely forming a solid alloy, the alloy is crushed in a crusher under a non-oxidizing atmosphere, whereby fine particles of hydrogen adsorption alloy of desired particle size are obtained.

It has also recently been proposed to obtain an alloy of desired composition keeping a solid state without dissolution. This method is generally referred to as the "Mechanical Alloying Process" which was originally developed by Benjamin of INCO U.S.A. in the 1970s. In this process, mechanical energy is applied to metal fine particles by means of a high energy ball mill (Attritor) and ultra-fine particles are dispersed by repeating cold press-fitting and breakdown.

With respect to the principle of this mechanical alloying, it is generally understood that the process comprises a series of steps of: forging fine particles by large impact milling with the particles being flattened and flaked; breaking down or peeling the hardened particles and repeating cold forge welding (kneading); growing a lamella structure between the alloy components thereby forming rapidly fine crystal grains so that particles of one metal may be dispersed into those of another metal; and equiaxing shaping of the particles thereby achieving a randomization.

M. Y. Song and E. I. Ivanov published the results of an experiment on alloying fine particles of Mg and Ni using the Mechanical Alloying Process by means of a planetary ball mill (Hydrogen Energy Vol 10 No. 3 P. 169–178, 1985).

It was reported that, in this experiment, acceleration of the planetary ball mill was established to be 0.6 G, and a carbonyl type Ni was employed and mixed with Mg under an Ar gas atmosphere for 30 minutes to obtain samples. The samples were then subjected to various hydrogen treatments and comparatively discussed after X-ray diffraction. According to the report, it was acknowledged that among the samples on which hydrogen treatment was repeated from 1 to 58 times, phases of $Mg_2Ni$ and a very small amount of MgO, Mg, Ni were detected existing in a mixed state in the samples subjected to less hydrogen treatment, and therefore heat treatment (annealing) was applied thereto. on the other hand, in the samples subjected to a larger number of hydrogen treatments, most of the Mg and Ni is transformed to $Mg_2Ni$. As a result of this, it was reported that heat treatment was more effective than repetition of hydrogen treatment. Thus, a production method of hydrogen adsorption alloy without depending upon dissolution was disclosed for the first time, though it was not a perfect method.

It is well known that production of hydrogen adsorption alloy by the conventional method requiring the step of dissolution requires high level techniques as well as sufficiently controllable equipment. For example, in the case of producing $Mg_2Ni$, the vapor pressure of Ni fluctuates at a high level such as 2057 mmHg at 10° C., 2732 mmHg at 760° C., and the vapor pressure of Mg fluctuates from 743 mmHg to 1107 mmHg. The vapor pressure of Ca fluctuates similarly from 983 mmHg to 1487 mmHg. Under such a wide range of fluctuation, it is very difficult to increase furnace temperature while keeping the vapor pressure well-balanced. From the viewpoint of dissolution, the question of whether the degree of solid solution of both components is high or low may more or less influence alloying and make it difficult for alloying, but what is most important is the difference between two components relative to the density aspect and the melting point. They are respectively 8.90 $g/cm^3$ and 1455° C. in Ni, 1.74 $g/cm^3$ and 650° C. in Mg, and 1.55 $g/cm^3$ and 850° C. in Ca, which clearly shows the difficulty in alloying Mg or Ca with Ni. On the other hand, the density and melting point of La are respectively 6.15 $g/cm^3$ and 826° C. This density of La may be approximate to that of Ni and reduce the difficulty to a certain extent. However, rare earth metals are very precious and expensive resources.

A serious problem in alloying Mg and Ni exists in that the vapor pressure of Mg reaches approximately 25 $Kg/cm^3$ which is near the melting point of Ni, and because of such a high pressure it is difficult to prevent molten metal from vaporizing and bringing about excess Ni, eventually resulting in a product wherein $MgNi_2$ is not partially hydrated. If mixing excessive Mg to prevent such a problem, there arises a different problem of containing separate the single substance of Mg, the chemical structure of which is nominally $Mg_{2.35}Ni$ but actually $Mg_2Ni+Mg_{0.35}$.

The mentioned problems affect the characteristics of the obtained hydrogen adsorption alloy as described hereunder with reference to FIGS. 9 and 10.

FIG. 9 is a pressure-composition isothermal line diagram (hereinafter referred to as "PCT line diagram") of a hydrogen adsorption alloy $Mg_{2.35}Ni$ obtained by the method including the dissolving step (hereinafter referred to as "dissolving method"). In this drawing, the ordinate axis indicates the hydrogen pressure P (in MPa) and the abscissa axis indicates the atomic ratio N/M of hydrogen gas to metal so as to show the behavior of the atomic ratio according to the adsorption and discharge of hydrogen gas at a fixed temperature (350° C.).

The curve in this drawing indicates that when hydrogen has reached nearly 0.5, both adsorption and discharge are clearly divided into a portion A of gentle inclination rightward and a portion B of almost horizontal direction also rightward. The portion A shows adsorption and discharge of hydrogen in and from a single substance, hydrogen, and the portion B shows adsorption and discharge of hydrogen in and from $Mg_2Ni$. In other words, the existence of the portion A means that there is Mg to be combined with hydrogen gas, and that Mg for inferior to $Mg_2Ni$ in view of its affinity is contained in the alloy, resulting in a decline of its function as a hydrogen adsorption alloy.

FIG. 10 is a high pressure thermal difference analysis diagram (hereinafter referred to as "DTA line diagram") of the same sample as FIG. 9, and in which the ordinate axis indicates temperature and the abscissa axis indicates time. Curve C shows temperatures obtained by measuring $Mg_{2.35}Ni$ charged in a container after sealing hydrogen of a certain pressure (1.1 MPa) in the container, heating the container from outside to 500° C. at its highest otherwise cooling it down from 500° C. Curve D shows the temperature difference generated between the sample and a reference sample (alumina) charged in the container for comparison. Since an exothermic reaction takes place at the time of adsorbing hydrogen gas and an endothermic reaction takes place at the time of discharging it, a downward peak corresponding to the discharge is seen at the time of heating, while an upward peak corresponding to the adsorption is seen at the time of cooling, in the curve D. However, as is clearly shown by points P, Q and R, when looking carefully, it is found that each peak is in the form of a double peak or refracting points similar to double peaks and not a single peak form. And this means that phase changes take place not only between $Mg_2Ni$ and $Mg_2NiH_4$ but also between Mg and $MgH_2$. Such phase change between Mg and $MgH_2$ occurs because Mg dissociates at higher temperature than $Mg_2Ni$ under the same hydrogen pressure.

FIGS. 11(a) and (b) show other data supporting the above fact, and in which FIG. 11(a) is a mapping diagram of Ni and FIG. 11(b) is the same diagram for Mg both prepared by an electronic probe microanalyzer.

In FIG. 11(a) the white dots represent the existence of Ni, and the more the density of white dots are, the more Ni exists, while the black portions show the nonexistence of Ni. In FIG. 11(b) the white portions show the existence of Mg while the black portions show the nonexistence of Mg.

In FIGS. 11(a) and (b), the distribution of Ni and Mg is not even but partial, which means that alloying of $Mg_2Ni$ is insufficient resulting in the existence of single phase Mg and Ni.

In effect, a serious problem of hydrogen adsorption alloy produced by the mentioned dissolving method exists in that components negatively affecting the quality of the alloy still remain in mixture in addition to the production difficulty thereof.

On the other hand, the attempt to obtain $Mg_2Ni$ by the so-called mechanical alloying method instead of the dissolving method mentioned above suggests a certain technical feasibility. It was recognized, however, that after repeating hydrogeneration and dehydrogeneration of sample alloy under the conditions of 0.7 MPa and 300° C., single phase Mg or Ni did not disappear by simply repeating hydrogeneration several times, but that the sample alloy could be almost entirely transformed to $Mg_2Ni$ only after completing a heat treatment in which the temperature was kept at 270 to 300° C. for a long time of two months and repeating hydrogeneration 58 times. Though this method is called the mechanical alloying method, the state of the art has not reached yet a satisfiable level of alloying of different kinds of metal. After all it may be a reasonable evaluation that this method still remains at a level wherein oxides of the same metal system are simply dispersed in the form of ultra-fine particles in metal particles, or the phase of the starting material of metal composition is changed to a different one (amorphous phase, for example).

SUMMARY OF THE INVENTION

The present invention provides a solution of the above-discussed problems and has as an object to provide a method for producing a hydrogen adsorption alloy of high alloying percentage from two or more kinds of base metals without involving any step of dissolving them.

To accomplish the foregoing object, a method for producing a hydrogen adsorption alloy of high alloying percentage in accordance with the present invention comprises the steps of: charging fine particles of two or more kinds of metals adapted for alloying to form a hydrogen adsorption alloy together with milling balls in mill pots of a high speed ball mill; converting the internal part of the mill pots to be a non-oxidizing atmosphere; applying an acceleration of more than 30 times as large as gravitational acceleration to the mill pots for mixing, milling and dispersion of the fine particles.

It is preferable that the non-oxidizing atmosphere is achieved by filling the mill pots with any one of Ar gas, He gas or $N_2$ gas.

It is also preferable that one or more of the two or more kinds of metals is selected from among a group including Mg, Ca, La, misch metal and Ti, while the remaining one or more of the two or more kinds of metals is selected from among a group including Ni, Al, V, Cr, Fe, Co, Zr, Cu and Mn.

A high speed ball mill essentially required for embodying the present invention comprises a planetary ball mill of the batch type having mill pots detachably connected to means for converting the mill pot to a non-oxidizing atmosphere, each mill pot revolving following rotation of a main shaft and rotating also on its own axis, and in which a composite milling acceleration ratio G applied to the internal part of each mill pot is at least 30 and the rotational angular velocity ratio R is 1.9 or less, the composite crushing acceleration ratio G being expressed as:

$$G = a\max/g = (\omega 1)^2/2g(K+NX(1+R)^2)$$

where g: is the composite milling acceleration ratio;

a max: the composite milling acceleration (m/x²);

g: the acceleration of gravity (m/s²);

ω1; the angular velocity of revolution (1/s);

K: the diameter of revolution (m);

N: the internal diameter of the mill pot (m);

ω²: the relative angular velocity of rotation with respect to revolution (1/s); and R: the ratio ω2/ω1.

Since, in the production method according to the present invention, two or more kinds of metals adapted for forming hydrogen adsorption alloy is alloyed without dissolving them in a furnace, the method may be said to be a type of mechanical alloying method. As a matter of fact, however, a considerably large acceleration as compared with those of the well known conventional ball mills is applied to the mill pots, whereby an alloy of remarkably higher alloying percentage than that obtained by the prior method was achieved. Since this acceleration is established to be at least 30 times as large as the gravitational acceleration, which is a most essential requirement for successfully carrying out the production method of the present invention, it is a matter of course that an apparatus for use in carrying out the production method of the present invention should also satisfy such a requirement.

Though the most desirable process of mechanical alloying has not been completely established yet and is still under research and development, it is generally said that there are two essential requirements, i.e., that sufficient diffusion of atoms takes place and that enthalpy ΔHm in mixture is negative and large. It is natural that, largely when applying effective energy, diffusion of atoms at low temperature is more advanced. In the conventional mechanical alloying, the fine particles undergo a series of processes of flattening, flaking, cold forge welding (kneading), growing lamella structure, dispersing and randomization, as mentioned above. On the other hand, in the present invention, it may be said that the alloying has advanced to the stage of strong atomic combination.

As mentioned above, it is an advantage of the present invention that hydrogen adsorption alloy can be produced without dissolving metal materials, and the alloy thus obtained contains only effective alloy components which effect a speedy phase change to hydride and does not contain any other single phase metal. Accordingly, the reaction on hydrogen is fast, and discharge therefrom reaches almost its theoretical value. As a result, when applying the present invention to various kinds of uses in conventional manners, the present invention exhibits a superior advantage over the prior art. Furthermore, since the production cost is saved considerably as compared with the prior methods requiring the dissolving step and hydrogen adsorption alloy can be freely produced without using expensive La, a significant advantage is assured in view of the improvement of quality and economy.

Other objects, features and advantages of the present invention will become apparent in the course of the following description with reference to the accompanying drawings.

BRIEF DESCRIPTION OF THE DRAWINGS

In the drawings forming a part of the present application,

FIG. 4 is a PCT line diagram of a sample according to an embodiment of the present invention;

FIG. 5 is a DTA line diagram of the same sample;

FIG. 6(a) shows an analytical result of a standard (reference) sample of the same component as the sample, and FIGS. 6(b) and 6(c) respectively show analytical results of standard samples of $Mg_2Ni$ and Mg by X-ray analysis;

DESCRIPTION OF THE PREFERRED EMBODIMENT

Figure 1:
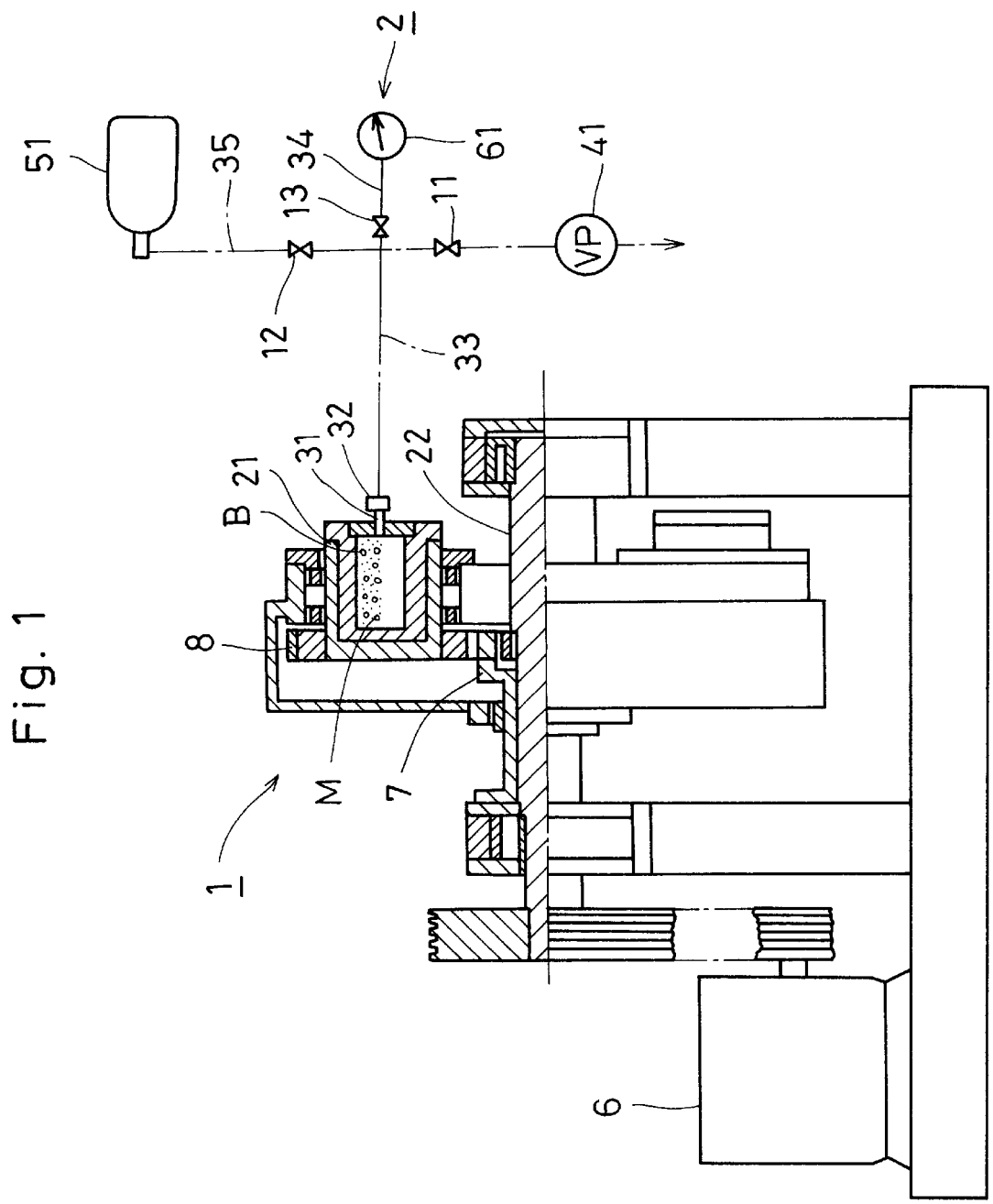
FIG. 1 is a longitudinal front view of an apparatus used to embody the method according to the present invention.
Figure 2:
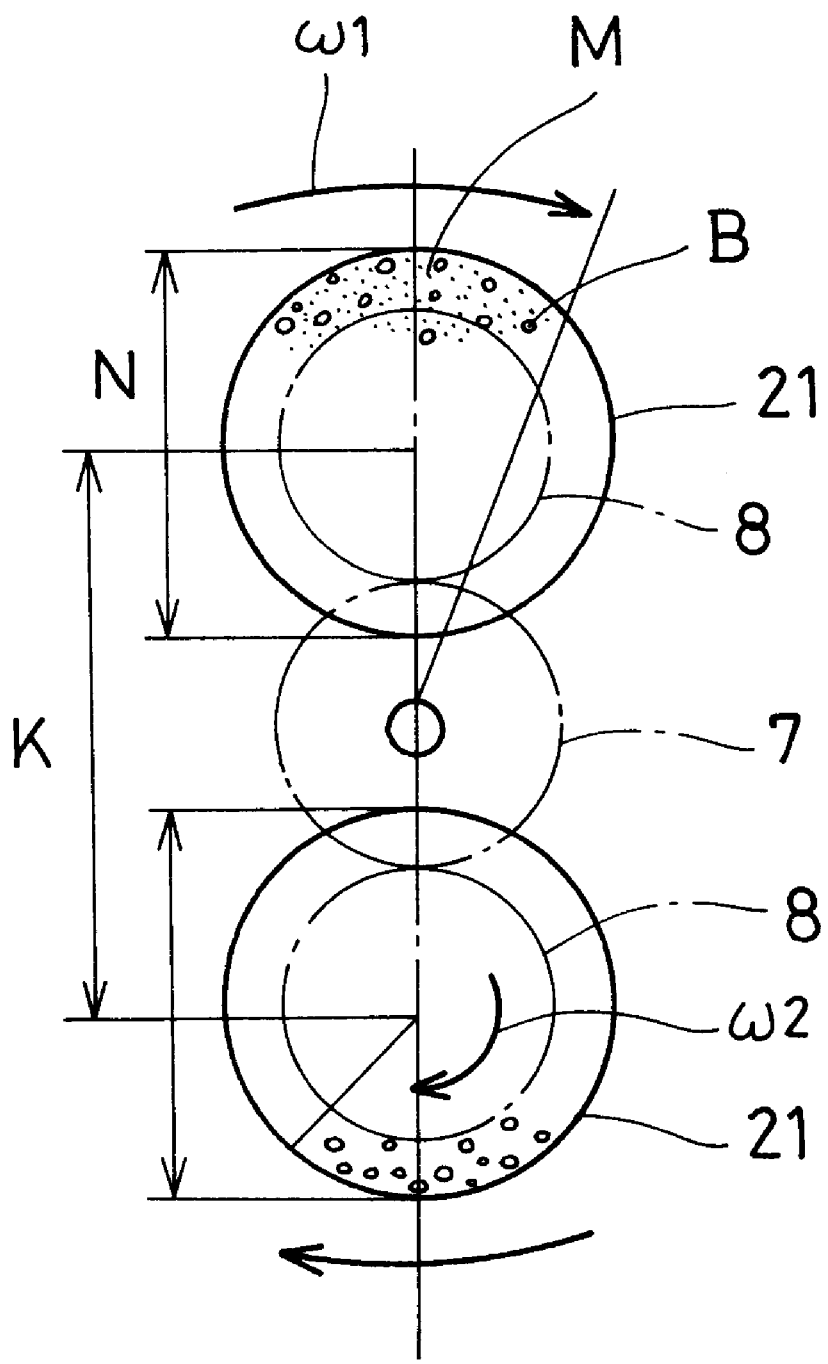
FIG. 2 is a schematic view showing movement or motion of the apparatus.

FIGS. 1 and 2 show a planetary ball mill 1 of the batch type which is an essential requirement of the production method of the present invention.

Describing first a general construction of this planetary ball mill 1 with reference to these drawings, a plurality of symmetrically disposed mill pots 21 mounted to revolve in response to the rotation of a main shaft 22 rotated by a motor 6 (i.e., radially at an equal distance from a main shaft 22). It is to be noted that each mill pot itself rotates on its own axis. More specifically, a planetary gear 8 is disposed on the outer periphery of each [the] mill pot 21 [which rotates in response to the main shaft 22], and a sun gear 7 mating with each [the ] planetary gear 8 is fixedly mounted with respect to the planetary gears 8 [independently rotated or stopped (FIG 2 shows a stopped state)], whereby, as further illustrated in FIG. 2, rotation of the main shaft 22 causes each [the] mill pot 21 [is caused] to revolve around the main shaft 22 at an angular velocity ω1 while rotating on its own axis at an angular velocity ω2. The sun gear 7 is mounted around [on] the outside of the main shaft 22 permitting relative rotation of the main shaft 22. Milling balls B perform as milling medium and fine metal particles M are, along with the milling balls B received in each mill pot 21. The internal atmosphere of the mill pot 21 is substituted with an inert gas such as Ar gas in order to prevent the fine metal particles M from oxidizing.

Each mill pot 21 is supported by a casing 23 which in turn is supported by bearings 24a, 24b to a housing 25.

With respect to the operation of an atmosphere converting means 2, the process of substituting Ar gas for air comprises the steps of attaching a pipe 31 to a cap of the mill pot 21; mounting a pair of one-touch couplers 32 on one end of the pipe; and connecting the pipe 31 to a vacuum pump 41 through a pipe 33 and a valve 11, to a pressure gauge 61 through a valve 13 and a pipe 34, and to a cylinder 51 filled with Ar gas through a pipe 35 and a valve 12. Vacuum suction is generated by the vacuum pump 41 while the valve 12 is fully closed and the valves 11, 13 are fully open, thereby air in the mill pot 21 is evacuated. After noted by reference to the pressure gauge 61 that pressure has reached a predetermined degree, the valve 11 is fully closed while the valve 12 is fully opened, whereby the mill pot 21 is filled with Ar gas from the Ar gas charged cylinder 51. Then, after noting that the pressure of the filled Ar gas has reached the same level as atmospheric pressure or any other predetermined pressure higher than atmospheric pressure, the valve 12 is also fully closed, and the pipe 31 is separated from the pipe 33 at one one-touch coupler 32. The Ar gas in the mill pot 21 is held by the remaining one-touch coupler 32. The foregoing Ar gas filling operation is performed one or more times.

After charging the milling balls B and the fine metal particles M into the mill pot 21 and filling the mill pot 21 with Ar gas, the planetary ball mill 1 is put into operation, whereby centrifugal force and Coriolis force produced by the rotation and revolution act together on the milling balls B and fine metal particles M, thus treating the fine metal particles M.

FIG. 2 is a schematic view showing the motion of the mill pot in the planetary ball mill, and in which $\omega 1$ indicates the angular velocity of revolution, the diameter of revolutions K is set to 0.52 m, the internal diameter N of the mill pot is set to 0.075 m, $R = \omega_2/\omega_1$, and $\omega_2$ indicates an angular velocity of rotation with respect to revolution so that composite milling acceleration ratio G applied to the internal part of the mill pot is at least 30 to 90 when calculated by the mentioned expression.

In this connection, "a max" shows composite milling acceleration (m/s$^2$), and there is established a relationship of G=a max/g.

TABLE 1

| G(-) | $\omega_1$(1/s) | K(m) | M(m) | $\omega_2$(1/s) | R(-) | a max(m/s$^2$) |
|---|---|---|---|---|---|---|
| 30 | 25.0 | 0.52 | 0.075 | 34.0 | 1.36 | 293 |
| 90 | 43.3 | 0.52 | 0.075 | 59.0 | 1.36 | 883 |

It is to be noted that the relationship between rotation and revolution is also one of the important elements.

Figure 3A:
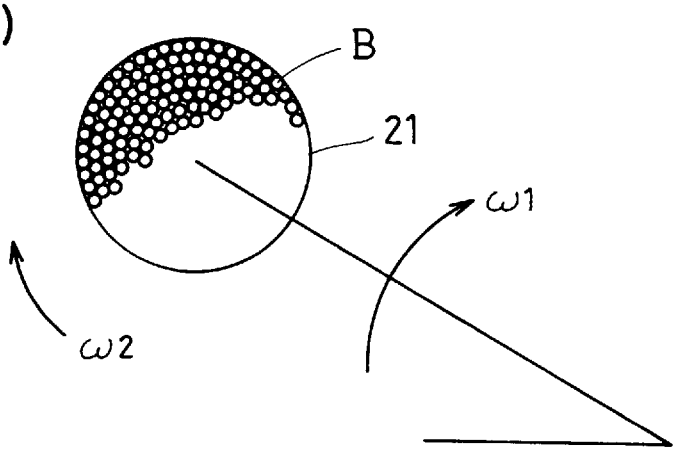
FIGS. 3(a), 3(b) and 3(c) show the movement of the balls and the relative percentage of the angular velocity between rotation and revolution of the mill.
Figure 3B:
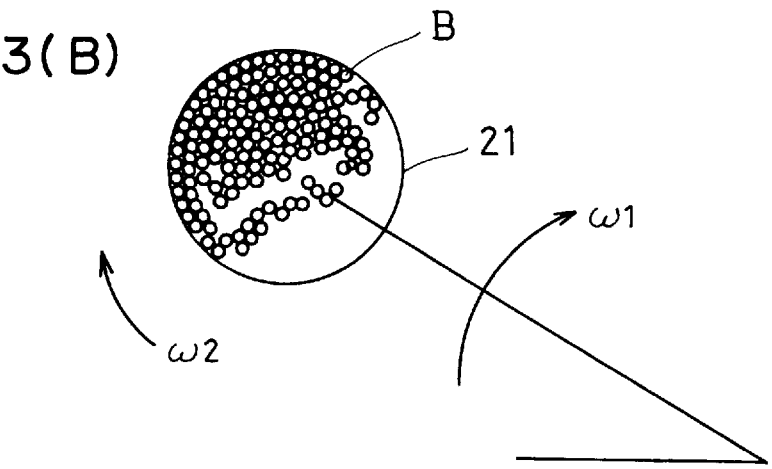
Figure 3C:
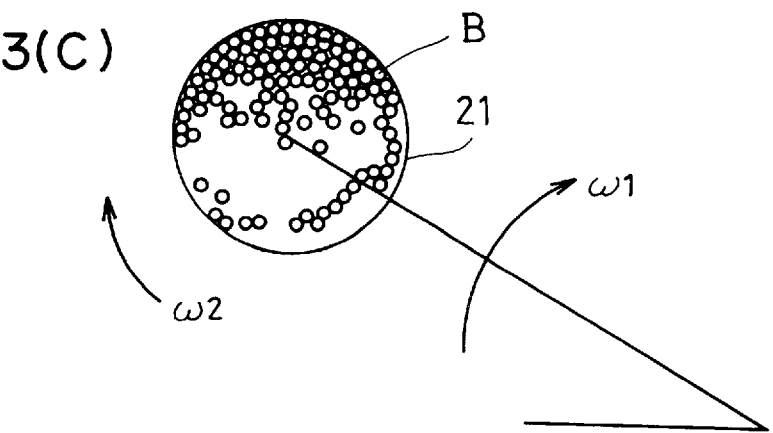

FIGS. 3(*a*), (*b*) and (*c*) show movement of the balls, and the relative percentage of the angular velocity between the revolution and rotation of the mill. FIG. 3(*a*) shows a state of the mill pot in which the angular velocity of revolution is established as $\omega_1$, the rotational relative angular velocity as $\omega_2$ and the ratio R between the two velocities $= \omega_2/\omega_1$, in which R indicates 0.5. In this state, the balls surge in a group or they form a unit along the inner periphery of the mill pot, and compressive force and shearing force are effectively applied to the metals located between the inner periphery and the balls or between the balls in such a manner as to perform an effective function for satisfactory mechanical alloying. Behaviour of the balls is shown in FIG. 3(*b*) when R=1.0 and in FIG. 3(*c*) when R=1.22. It is noted that when the percentage of the rotational relative angular velocity becomes relatively large, a part of the balls separate from the inner periphery of the mill pot and become airborne inside the mill pot, thus a part of the energy is wasted or lost due to collision among the balls, which is an undesirable phenomenon in view of the mechanical alloying. This undesirable phenomenon becomes more serious when R is larger, and when R exceeds 1.9 no hydrogen adsorption alloy of high alloying percentage can be obtained even though the composite crushing acceleration ratio is more than 30. In view of the foregoing, it is preferable that R is uniformly set to 1.36, more preferably, in the range of 1.5 to 0.5.

In the foregoing embodiment, Mg$_2$Ni was selected of all other hydrogen adsorption alloys, Ni materials as fine particles of 9 $\mu$ in average particle size and Mg fine particles of 85 $\mu$ in average particle size. These two materials were weighed to be a predetermined composition percentage of the intended alloy and charged in the mill pots. Further, balls of high carbon Cr bearing steel each being 3 to 5 mm in diameter were placed in the mill pot to occupy 30% of inside space of each mill pot.

Establishing the composite crushing acceleration ratio G to be 30 and 90 respectively, a plurality of samples were prepared on the same conditions but vary only in the operation time of the mill in the range of 20 minutes to 12 hours. Then, inspections were carried out on each of the prepared samples by various kinds of inspection equipment from the viewpoint of whether or not single phase Mg still remained.

Following inspection, results were obtained with regard to the samples prepared by operating the mill pots for 12 hours on the condition of G=30:

(1) PCT Line Diagram

Figure 9:
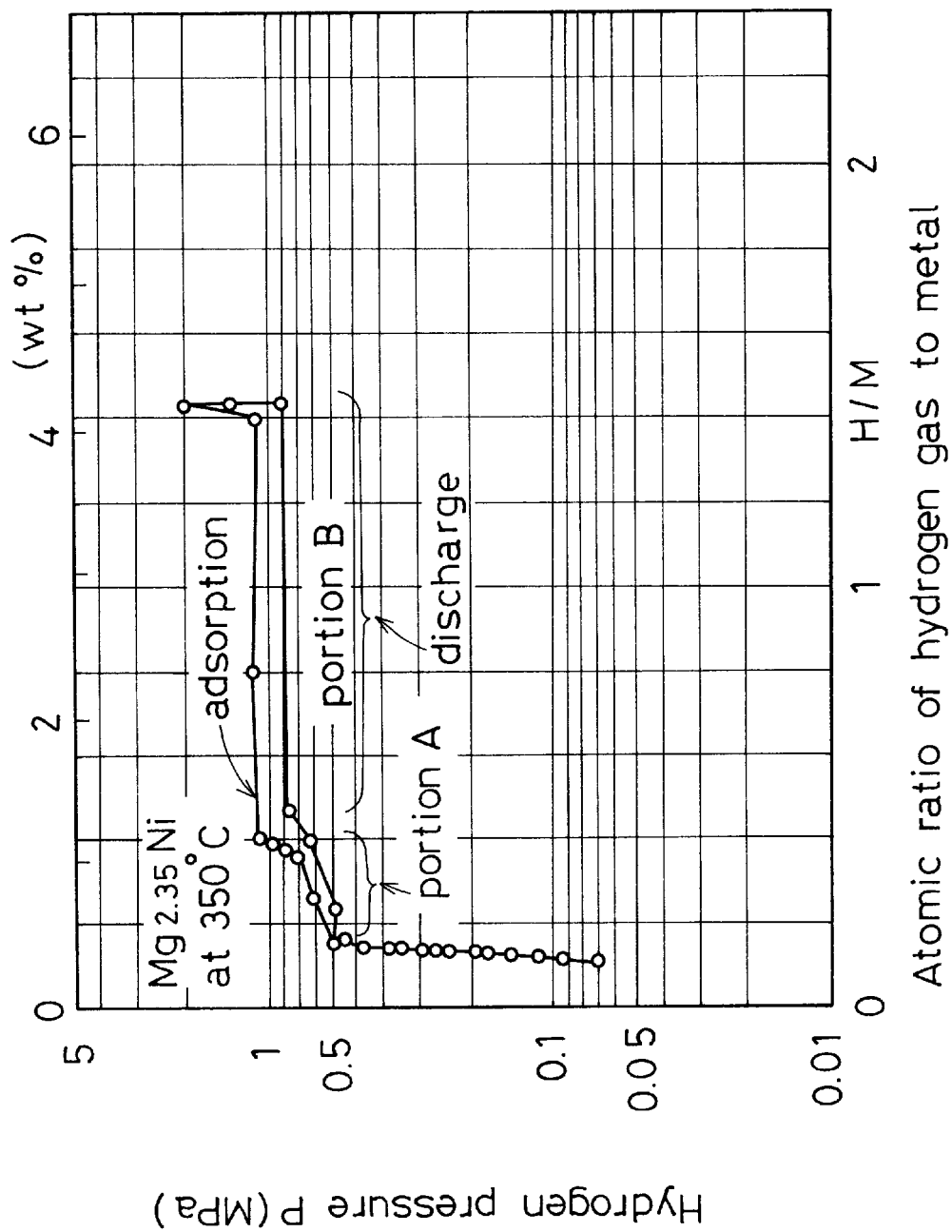
FIG. 9 is a PCT line diagram of a sample according to the prior art.

FIG. 4 is a PCT line diagram of the samples, and as compared with the prior art shown in FIG. 9, almost horizontal curves of discharge and adsorption of hydrogen gas are shown therein, which means that a phase change takes place alternately between Mg$_2$Ni and Mg$_2$NiH$_4$, and there exists no single phase Mg of small reaction speed.

(2) DTA Line Diagram

Figure 10:
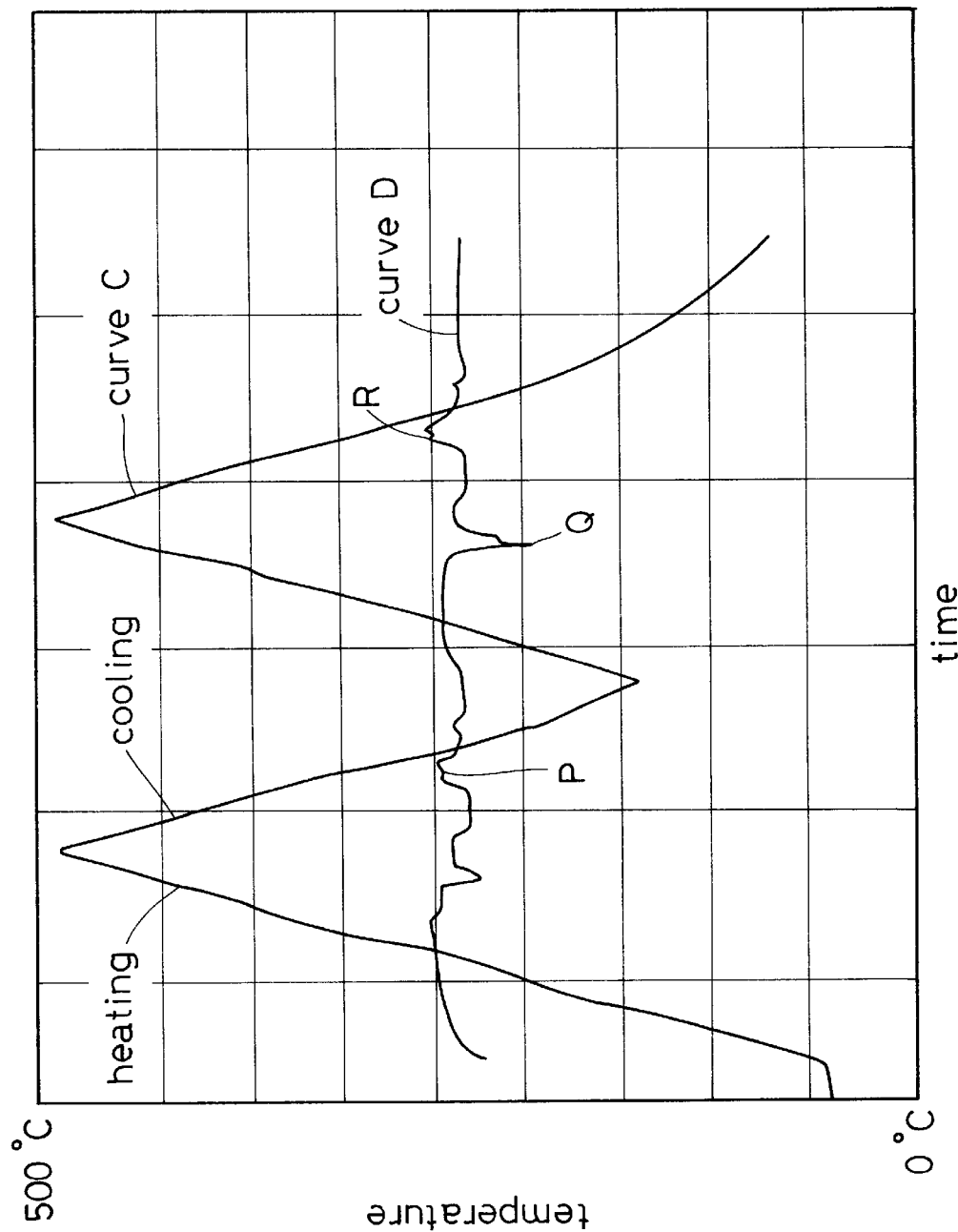
FIG. 10 is a high pressure thermal difference analysis diagram of the sample of FIG. 9.
Figure 11A:
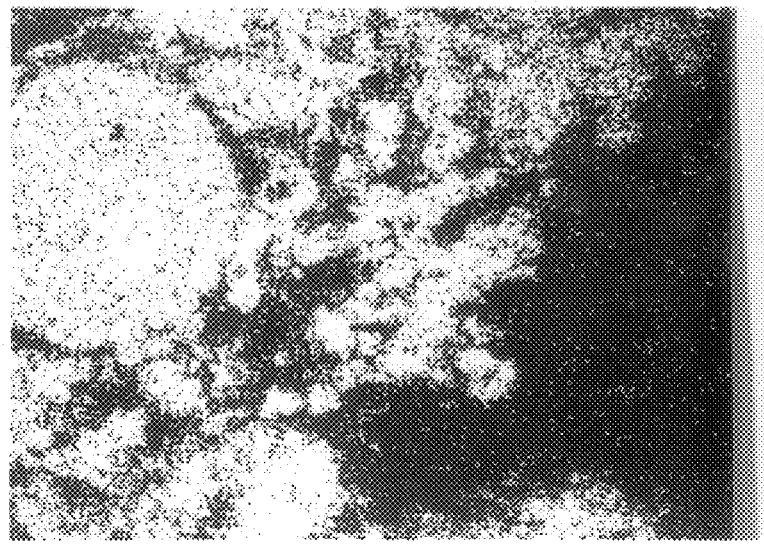
FIG. 11(a) and 11(b) are microphotographs of metal structure taken by an electronic probe microanalyzer and showing respectively the manner of distribution of Ni and Mg according to the prior art.
Figure 11B:

FIG. 5 is a DTA line diagram obtained on the same inspection conditions as FIG. 10 showing the prior art. Peaks of adsorption and discharge of hydrogen gas at the time of cooling and heating are seen at points P, Q and R, and these points are all single peaks and not the above mentioned double peaks representing the phase change of MgH$_2$-Mg.

(3) X-ray Diffraction Analysis

FIG. 6(*a*) is an X-ray diffraction analysis diagram, FIG. 6(*b*) is a standard diagram of X-ray diffraction of Mg$_2$Ni, and FIG. 6(*c*) is that of Mg. In these diagrams, the abscissa axis shows the degree of diffraction and the ordinate axis shows X-ray strength (indicated by the CPS count number of electric pulses per second). The peak shown in FIG. 6(*b*) is also found in FIG. 6(*a*) as it is, but the peak shown in FIG. 6(*c*) is hardly found in FIG. 6(*a*), which means that there remains substantially no single phase Mg in this sample and this sample is satisfiably alloyed in the composition of Mg$_2$Ni.

(4) Mapping Diagram of Mg and Ni

Figure 7A:
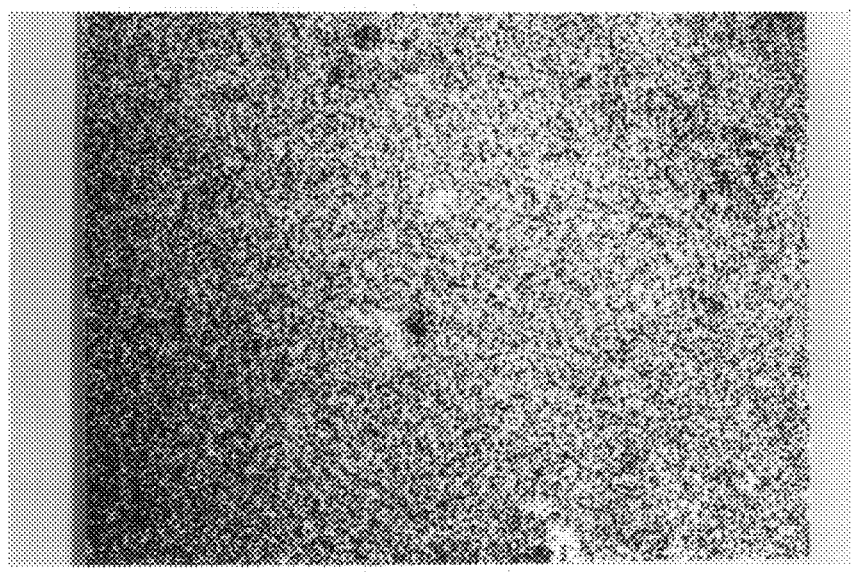
FIGS. 7(a) and 7(b) are microphotographs of the metal structure taken by an electronic probe microanalyzer and showing respectively the manner of distribution (diffusion) of Ni and Mg of the same sample.
Figure 7B:
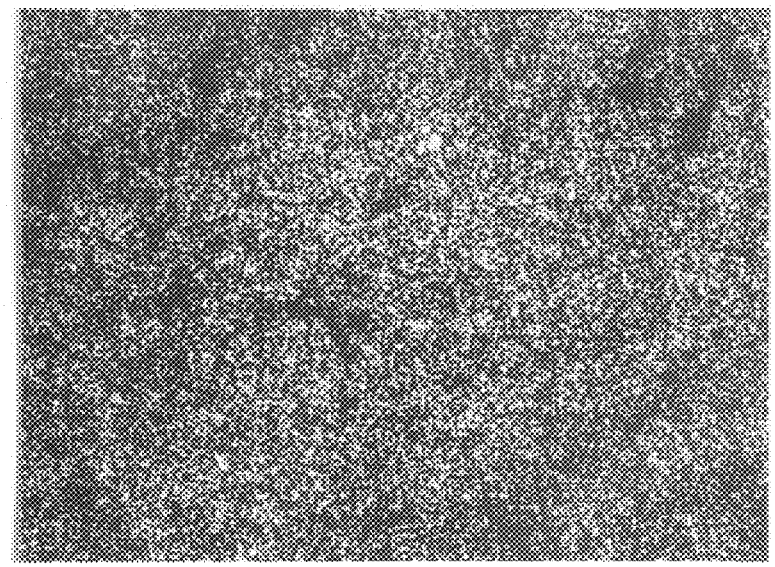

FIG. 7(*a*) is a mapping diagram of Ni and FIG. 7(*b*) is that of Mg both taken by an electronic probe microanalyzer, i.e., microphotographs (of 500 magnification) showing the distribution of each component. In FIG. 7(*a*) the white portions show the existence of Ni, and in FIG. 7(*b*) the white portions show the existence of Mg. It is understood that in both diagrams each component is almost evenly and uniformly distributed and there is no large part on which single phase Ni or Mg is concentrated.

Figure 8:
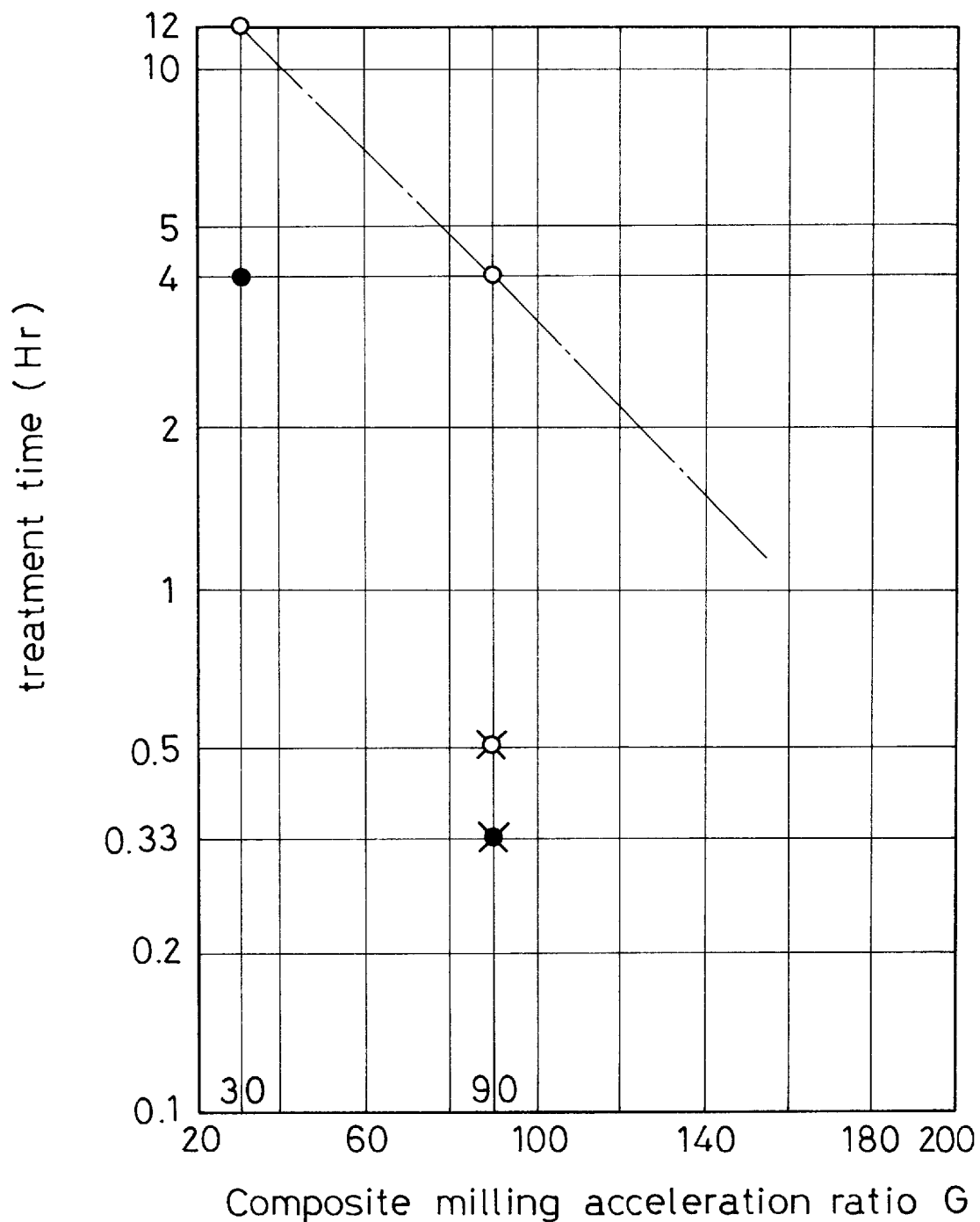
FIG. 8 is a diagram showing the technical advantages of the present invention.

FIG. 8 is a diagram showing a relationship between the composite milling acceleration ratio G obtained as a result of the foregoing tests (1) and (4) applied to every sample and the time required for the treatment in the mill pot from the viewpoint of alloying results. The white points indicate samples of successful alloying wherein no single phase Mg was found, while the black points indicate samples of incomplete alloying wherein single phase Mg still remained.

As a result of a series of the foregoing tests, it may be generally said that alloying is successfully achieved after performing the process for 12 hours when G is 30, and after performing the process for 4 hours when G is 90. In one of the tests, alloying was achieved after performing the process for only 30 minutes when G is 90, further studies and tests may be necessary in order to make clear the relation in this respect.

What is claimed is:

1. An apparatus for producing a hydrogen adsorption alloy, comprising a rotatable main shaft and a high speed ball mill in the form of a planetary ball mill mounted to said rotatable main shaft, said planetary ball mill having a housing mounting a plurality of mill pots for rotation, each mill pot defining an axis of rotation and each being detachably connected to means for converting the atmosphere in each mill pot to a non-oxidizing atmosphere, means for rotating said planetary ball mill about said main shaft wherein each mill pot revolves about said main shaft, and means for rotating each mill pot on its own axis in the same direction as the planetary ball mill rotates about the main shaft, wherein the composite milling acceleration ratio G applied to the internal part of each mill pot is at least 30 and the rotational angular velocity ratio R is at most 1.9, said composite milling acceleration ratio G being expressed by:

$$G = a\max/g = (\omega 1)^2 / 2g(K + N \times (1+R)^2),$$

where G is the composite milling acceleration ratio;

a max is the composite milling acceleration (m/S);

g is the acceleration of gravity (m/S);

$\omega 1$ is the angular velocity of revolution (1/S);

K is the diameter of revolution (m);

N is the internal diameter of the mill pot (m);

$\omega 2$ is the relative angular velocity of rotation with respect to revolution (1/S); and R is the ration $\omega 2/\omega 1$.

2. An apparatus for producing a hydrogen adsorption alloy according to claim 1, wherein said means for rotating each mill pot includes planetary means mounted to said main shaft and to each mill pot to rotate each mill pot, and wherein fine particles of at least two kinds of metals are adapted for alloying, at least one of the at least two kinds of metals being selected from the group consisting of: Mg, Ca, La, misch metal and Ti, while the remaining at least one of the at least two kinds of metal being selected from the group consisting of: Ni, Al, V, Cr, Fe, Co, Zr, Cu and Mn.

* * * * *